(12) United States Patent
Hemsen et al.

(10) Patent No.: US 8,042,712 B2
(45) Date of Patent: Oct. 25, 2011

(54) SYSTEM FOR DISPENSING FLUID PRODUCT

(75) Inventors: Steven J. Hemsen, Southington, CT (US); John P. Breault, New Britain, CT (US)

(73) Assignee: Henkel Corporation, Rocky Hill, CT (US)

( * ) Notice: Subject to any disclaimer, the term of this patent is extended or adjusted under 35 U.S.C. 154(b) by 689 days.

(21) Appl. No.: 11/722,547

(22) PCT Filed: Dec. 27, 2005

(86) PCT No.: PCT/US2005/047113
§ 371 (c)(1),
(2), (4) Date: Jun. 22, 2007

(87) PCT Pub. No.: WO2006/071880
PCT Pub. Date: Jul. 6, 2006

(65) Prior Publication Data
US 2008/0142552 A1    Jun. 19, 2008

Related U.S. Application Data

(60) Provisional application No. 60/640,026, filed on Dec. 29, 2004, provisional application No. 60/705,513, filed on Aug. 4, 2005.

(51) Int. Cl.
*B65D 88/54* (2006.01)
(52) U.S. Cl. .......................... 222/389; 222/334
(58) Field of Classification Search .............. 222/334, 222/389; 173/177, 17, 207; 60/545, 533; 92/85 B, 134; 188/266, 275, 280, 313, 314, 188/322.21
See application file for complete search history.

(56) References Cited

U.S. PATENT DOCUMENTS

| 5,238,147 | A | * | 8/1993 | Yasui et al. | 222/1 |
| 5,816,445 | A | * | 10/1998 | Gardos et al. | 222/1 |
| 5,964,381 | A | * | 10/1999 | El-Hage et al. | 222/386 |
| 6,299,031 | B1 | * | 10/2001 | Cavallaro et al. | 222/334 |
| 6,575,331 | B1 | * | 6/2003 | Peeler et al. | 222/1 |

* cited by examiner

*Primary Examiner* — Kevin P Shaver
*Assistant Examiner* — Donnell Long
(74) *Attorney, Agent, or Firm* — Steven C. Bauman

(57) ABSTRACT

The subject invention is a system for dispensing a controlled amount of fluid product from a dispensing container which includes a pneumatically driven dispensing actuator. This actuator includes a dispensing cylinder and a movable dispensing piston. The dispensing piston is movable under pneumatic pressure within the cylinder, the cylinder including a volume of hydraulic fluid under the pneumatic pressure acting against the dispensing piston to selectively prevent movement of the dispensing piston. The invention further includes a means for selectively reducing the volume of the hydraulic fluid in the dispensing cylinder to allow the controlled movement of the dispensing piston. The controlled movement of the dispensing piston causes controlled displacement of the fluid product from the dispensing container. Advantageously, with the subject invention, a force may be generated and applied to a plunger, which can be accurately controlled. As will be recognized by those skilled in the art, the force results in movement of the plunger, which, in turn, translates into an accurate amount of fluid product being dispensed from the dispensing container.

15 Claims, 5 Drawing Sheets

SYSTEM FOR DISPENSING FLUID PRODUCT

CROSS REFERENCE TO RELATED APPLICATIONS

This application claims the benefit of U.S. Provisional Patent Application No. 60/640,026, filed Dec. 29, 2004, and U.S. Provisional Patent Application No. 60/705,513, filed Aug. 4, 2005, the contents of both of which are incorporated herein by reference.

FIELD OF THE INVENTION

This invention relates to systems for dispensing fluid product, and, more particularly, to systems for dispensing controlled amounts of fluid product.

BRIEF DESCRIPTION OF RELATED TECHNOLOGY

Systems for dispensing controlled amounts of fluid product are known in the prior art. For example, U.S. Pat. No. 6,662,969 B2, to Peeler et al. discloses a hydraulic controlled system for dispensing a target fluid from a container. The system includes an actuator that controls a hydraulic coupler, which in turn controls a slidable plunger located within the container. With actuation of the actuator, a master piston within the hydraulic coupler is urged forward to apply a hydraulic force on a slave piston to drive hydraulic fluid to the slidable plunger and cause movement thereof. This system, however, relies on the actuator alone for generating sufficient force to drive the master cylinder, which in turn applies a force on the slave piston to operate the system. An inherent handicap of this system is that, all of the power for displacing the target fluid, is derived from the actuator. This actuator may be limited in practical power and because it is also responsible for control, using it for power may cause control inconsistencies.

SUMMARY OF THE INVENTION

The subject invention is a system for dispensing a controlled amount of fluid product from a dispensing container which includes a pneumatically driven dispensing actuator. This actuator includes a dispensing cylinder and a movable dispensing piston. The dispensing piston is movable under pneumatic pressure within the cylinder, the cylinder including a volume of hydraulic fluid under the pneumatic pressure acting against the dispensing piston to selectively prevent movement of the dispensing piston. The invention further includes a means for selectively reducing the volume of the hydraulic fluid in the dispensing cylinder to allow the controlled movement of the dispensing piston. The controlled movement of the dispensing piston causes controlled displacement of the fluid product from the dispensing container. Advantageously, with the subject invention, a force may be generated and applied to a plunger, which can be accurately controlled. As will be recognized by those skilled in the art, the force results in movement of the plunger, which, in turn, translates into an accurate amount of fluid product being dispensed from the dispensing container.

The subject invention can be utilized with various fluid products. In addition, the fluid product may not only be in a liquid and/or gas form, but may be in any dispensable form, such as in a powder or paste form. It is envisioned that the subject invention will be particularly well-suited to be used with fluid products which require highly accurate dosing, such as adhesives, sealants and/or coatings, based on chemistries such as (meth)acrylates, acrylics, anaerobics, epoxies, urethanes, silicones, cyanoacrylates, benzoxazines, maleimides, and cyanate esters, which may or may not be modified with additive packages or whose viscosity and/or rheology may be adjusted by rheology modifiers and/or diluents.

These and other features of the invention will be better understood through a study of the following detailed description and accompanying drawings.

DETAILED DESCRIPTION OF THE INVENTION

Figure 1:
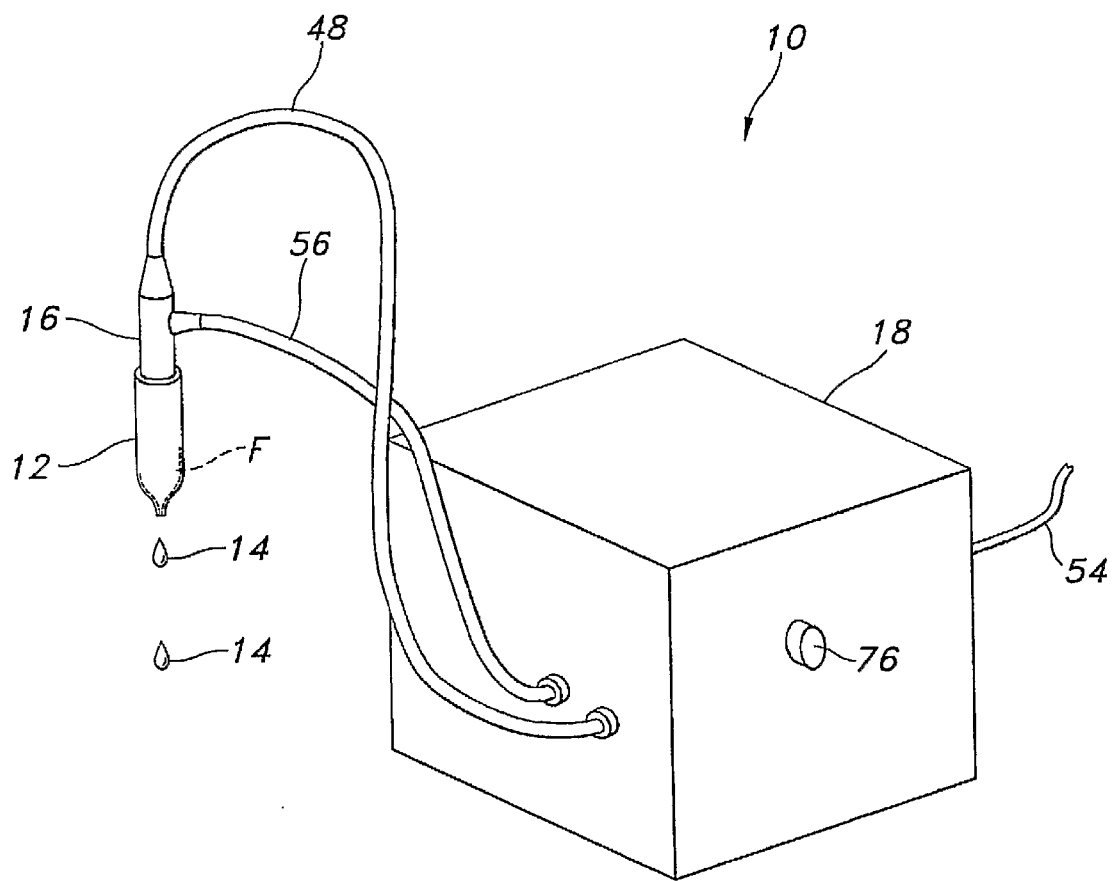
FIG. 1 is a perspective view of a system formed in accordance with the subject invention.

With reference to FIG. 1, a system 10 is provided for dispensing controlled amounts of fluid product from a dispensing container 12. The dispensing container 12 may include one or more doses 14 of fluid product F and may be disposable or refillable. Generally, the fluid product F, due to its own inherent characteristics (e.g., its viscosity) and/or the configuration of the dispensing container 12 (e.g., a re-sealable opening), will require urging to be dispensed from the dispensing container 12. The fluid product F may be an adhesive, sealant and/or coating, based on chemistries such as (meth)acrylates, acrylics, anaerobics, epoxies, urethanes, silicones, cyanoacrylates, benzoxazines, maleimides, and cyanate esters, which may or may not be modified with additive packages or whose viscosity and/or rheology may be adjusted by rheology modifiers and/or diluents. A dispensing actuator 16 engages the dispensing container 12 to control the dispensing of the fluid product F. Elements, as described below, which may or may not be included in a control housing 18, co-act with the dispensing actuator 16 in controlling the dispensing of the fluid product F.

Figure 2:
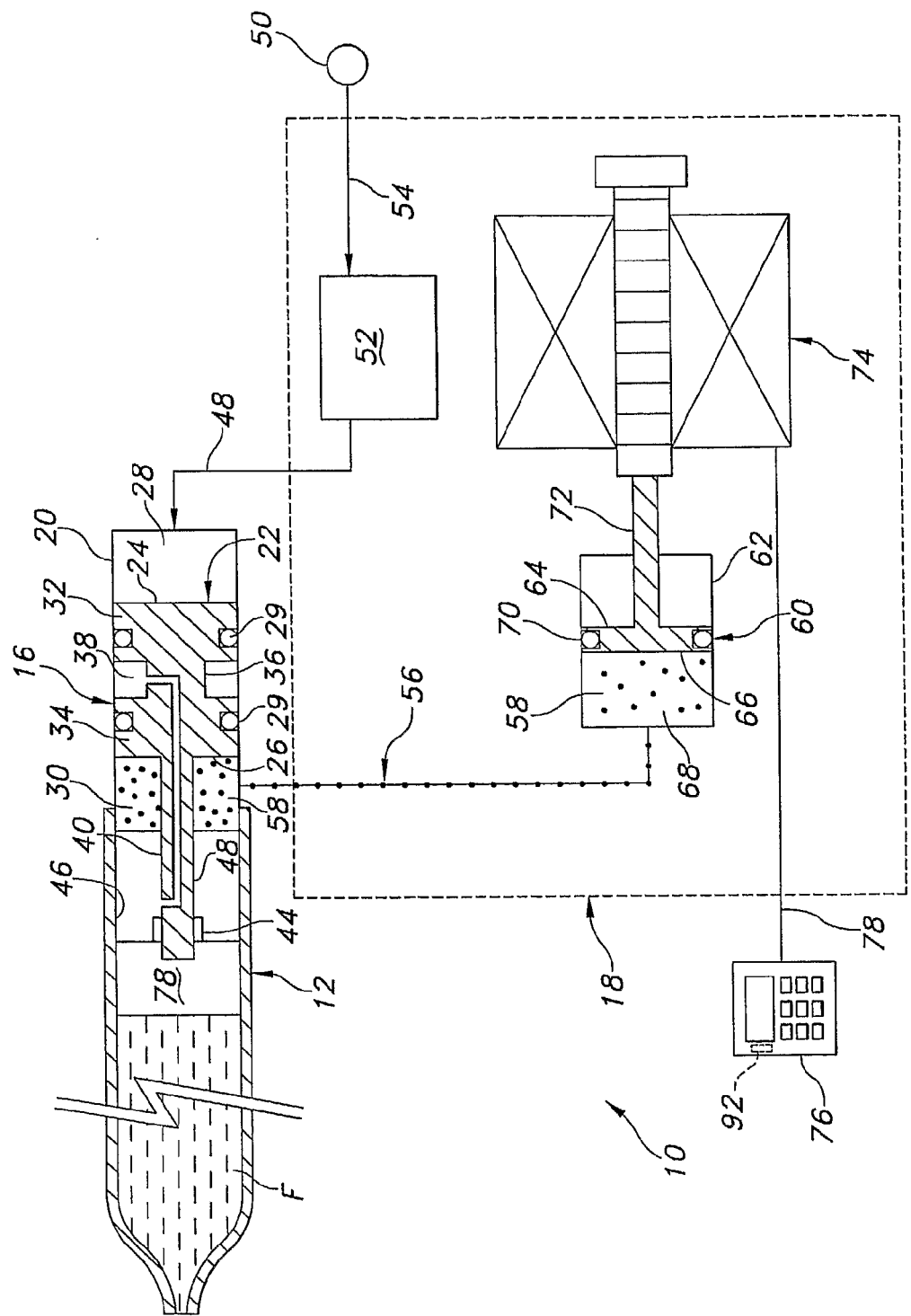
FIG. 2 is a schematic of a system formed in accordance with the subject invention.

With reference to FIG. 2, the system 10 includes two closed systems with a pressure differential therebetween controlling the dispensing actuator 16. More specifically, the dispensing actuator 16 includes a dispensing cylinder 20 in which is movably disposed a dispensing piston 22. Preferably, the dispensing piston 22 is a double-acting piston having a first face 24 and an opposing second face 26. A variable-volume first chamber 28 is defined within the dispensing cylinder 20 in engagement with the first face 24, while a variable-volume second chamber 30 is defined in the dispensing cylinder 20 in engagement with the second face 26. As will be appreciated by those skilled in the art, the respective volumes of the first and second chambers 28 and 30 will depend on the location of the dispensing piston 22 within the dispending cylinder 20. Preferably, the dispensing piston 22 seals the first chamber 28 from the second chamber 30 with one or more seals 29 (e.g., O-rings) so as to avoid fluid communication between the first and second chambers 28 and 30.

Any configuration of piston may be utilized for the dispensing piston 22. It is desired that the dispensing piston 22 be a spool piston having spaced-apart first and second disc portions 32, 34 respectively defining the first and second faces 24, 26. One or more of the seals 29, such as o-rings, can be located about the first and second disc portions 32, 34 to prevent fluid communication between the first and second chambers 28 and 30. A connecting bridge 36 extends between and connects the first and second disc portions 32 and 34. With the connecting bridge 36 having a reduced-diameter cross-section, an air space 38 may be defined therearound. To prevent pressurized air from crossing from the first chamber 28 into the second chamber 30, a relief outlet or vent passage 40 may be provided which communicates the air space 38 with the exterior of the dispensing cylinder 20.

A stem 42 extends from the dispensing piston 22 with sufficient length to extend into the dispensing container 12 from the dispensing cylinder 20. As shown in FIG. 2, the vent passage 40 may extend through the stem 42. Preferably, the dispensing container 12 and the dispensing cylinder 20 are formed to cooperatively engage so as to allow for securement therebetween. For example, the dispensing container 12 may be formed to snap-onto and/or be threaded onto the dispensing cylinder 20. A plunger 44 is secured to the end of the stem 42 for direct engagement with container piston 78. The container piston 78 is typically provided with the dispensing container 12 (the container piston 78 seals the rear end of the dispensing container 12). The plunger 44 is preferably disengagably fixed to the container piston 78, such as by a snap-fit or other mechanical interaction. With fixing, the plunger 44 may move in concert with the container piston 78.

It is preferred that the container piston 78 define a tight seal with an inner surface 46 of the dispensing container 12 and be disposed for direct engagement with the fluid product F. The dispensing cylinder 20, the dispensing piston 22, the stem 42, the plunger 44 and the container piston 78 should be sized and configured to provide sufficient stroke distance to dispense the entire contents of the dispensing container 12.

A pneumatic line 48 communicates with the first chamber 28 to provide a supply of pressurized air therein. The pneumatic line 48 preferably is a flexible line, such as a PVC or rubber hose, which allows for movement of the dispensing actuator 16. An inflexible line, such as metallic tubing, may alternatively be used. The pneumatic line 48 is connected directly or indirectly to a source of pressurized air 50, such as a compressor. In a preferred arrangement, as shown in FIG. 2, a regulator 52 is connected to the source of pressurized air 50 via source line 54. The regulator 52 regulates the pressure of the air coming from the source of pressurized air 50 so as to maintain the pressure of the air to be constant or substantially constant as introduced into the pneumatic line 48. It is preferred that a pressure of approximately 60 psig be maintained by the regulator 52 going into the pneumatic line 48. The pressure is dependent on the force needed to encourage the flow of the fluid product F. As will be recognized by those skilled in the art, the pressurized air need not pass through the control housing 18. For example, the regulator 52 may be located externally of the control housing 18, optionally in a separate housing.

A hydraulic line 56 is in communication with the second chamber 30. As with the pneumatic line 48, it is preferred that the hydraulic line 56 be formed from a flexible material, such as PVC or rubber hose, to allow for movement of the dispensing actuator 16. It may be formed also of an inflexible material, such as metal tubing. A volume of hydraulic fluid 58 is at least partially disposed in the hydraulic line 56 and the second chamber 30. Any form of hydraulic fluid may be used, but preferably, the hydraulic fluid is non-compressible. Preferably, the hydraulic line 56 is also connected to a braking device 60, which includes a braking cylinder 62 and a braking piston 64. The braking piston 64 includes an engagement face 66. A variable-volume braking chamber 68 is defined within the braking cylinder 62 in engagement with the braking face 66. The hydraulic line 56 specifically connects to the braking device 60 so as to create communication between the braking chamber 68 and the second chamber 30. Between the second chamber 30, the hydraulic line 56 and the braking chamber 68, a reservoir for the hydraulic fluid 58 is defined. As will be appreciated, movement of the dispensing piston 22 and/or the braking piston 64 will result in a volume change causing the hydraulic fluid 58 to be urged responsively into the second chamber 30 or the braking chamber 68. It is preferred that the braking piston 64 be sealed to contain the hydraulic fluid 58 within the braking chamber 68, such as with one or more o-rings 70. It is also preferred that the dispensing cylinder 20 be sealed about the stem 42 to prevent leakage of the hydraulic fluid 58.

The braking piston 64 includes a control stem 72 which is engaged by a controllable stop 74. Preferably, the control stem 72 is detachably attached to the controllable stop 74. The controllable stop 74 is formed to allow linear translation of the braking piston 64 in an accurate manner. As will be recognized by those skilled in the art, the controllable stop 74 may be a step motor or servomotor. The controllable stop 74 includes a button or knob 76 which is engageable by a user. The controllable stop 74 is configured to permit or cause the braking piston 64 to move a predetermined distance upon actuation, as described below. It is preferred that a high level of accuracy be provided to the controlled amount of movement.

In use, the dispensing container 12 is engaged by the dispensing actuator 16 with the container plunger 78 engaging the fluid product F. The system 10 is configured so that the dispensing piston 22 is in equilibrium between the first and second chambers 28 and 30 when at rest. In other words, no pressure differential is defined across the dispensing piston 22 at rest. Upon actuation, the controllable stop 74 retracts, thereby allowing the braking piston 64 to retract a predetermined distance, with the volume of the braking chamber 68 proportionately increasing. The braking piston 64 acts under pressure of the hydraulic fluid 58 in the braking chamber 68. As a result, the volume within the braking chamber 68 is changed, and the hydraulic fluid 58 travels from the second chamber 30 towards the braking chamber 68. As the hydraulic fluid 58 exits from the second chamber 30, the dispensing piston 22 is urged forward under the force of the pneumatic pressure, causing the plunger 44 to drive forward and force an amount of the fluid product F out of the dispensing container to define the dose 14. When the controllable stop 74 completes movement, and, thus, the braking piston 64 completes movement, the hydraulic fluid 58 within the second chamber 30, the hydraulic line 56 and the braking chamber 68 completes movement and the pneumatic pressure on the dispensing piston 22 is neutralized and forward movement thereof halted.

As will be appreciated by those skilled in the art, the actual volume of the dispensed dose 14 may be controlled by several factors, including, but not limited to: the distance traveled by the plunger 44 under force of movement of the dispensing piston 22; the configuration of the dispensing container 12 (e.g., the shape of the container; the configuration of the dispensing aperture); and, the cross-sectional area of the inner surface 46 of the dispensing container 12. In turn, these factors may be controlled by various other factors. For example, the distance traveled by the plunger 44 may be controlled by: the distance of travel of the braking piston 64 as allowed by the controllable stop 74; and, the ratio of volumes of the braking chamber 68 to the second chamber 30.

As will be further appreciated by those skilled in the art, the system 10 can be actuated repeatedly until all of the fluid product F is dispensed. Once the dispensing container 12 is emptied, the dispensing container 12 can be removed from the dispensing cylinder 20. The plunger 44 may be re-set to a start position with the braking piston 64 being driven forwardly to a start portion. In this manner, the dispensing piston 22 is forced backwardly under a hydraulic pressure, thus causing the plunger 44 to be retracted towards the dispensing cylinder 20. Once re-set, a full dispensing container 12 may be engaged onto the dispensing cylinder 20 for further use.

Figure 3:
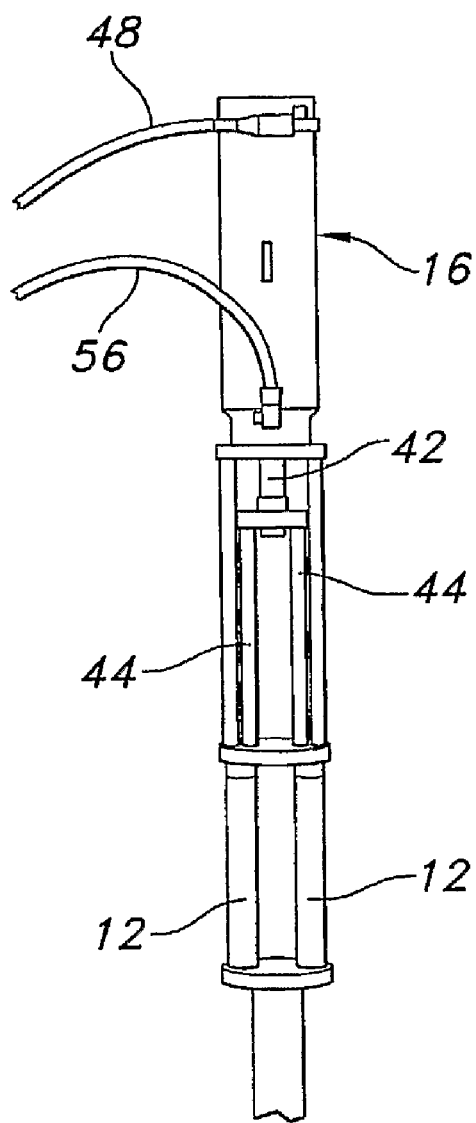
FIG. 3 is an elevational view of a system formed in accordance with the subject invention which accommodates a dual cartridge package.

Various configurations of the subject invention are possible as will be recognized by those skilled in the art. With reference to FIG. 3, the system 10 can be configured to accommodate multiple dispensing containers 12, which may be individually packaged or joined together with a common outlet. With this arrangement two- or more component products (e.g., two-part epoxies) may be accommodated. For each of the dispensing containers 12, a plunger 44 is secured to the stem 42. Thus, with movement of the stem 42, the plungers 44 move simultaneously. The fluid product F from each of the dispensing containers 12 is, thus, dispensed simultaneously from the dispensing containers 12 into a mixing chamber and through a dispensing aperture, into a common fluid path, or through separate dispensing apertures.

The system 10 may be provided with various controls (e.g., shut-off valves; on/off switches) and/or monitoring equipment (e.g., position sensors). These controls and/or monitoring equipment can be mounted to the housing 18 or other suitable location(s). For example, a controller 76 (e.g., a key-board controlled, hand-held programmable logic con (roller) can be used to control the system 10. The controller 76 can be operatively linked through one or more control lines 78. The controller 76 may be used to control dose characteristics (e.g., seta dosage amount—the dosage amount being proportional to the length of travel by the dispensing piston 22) and to monitor system characteristics.

Figure 4:
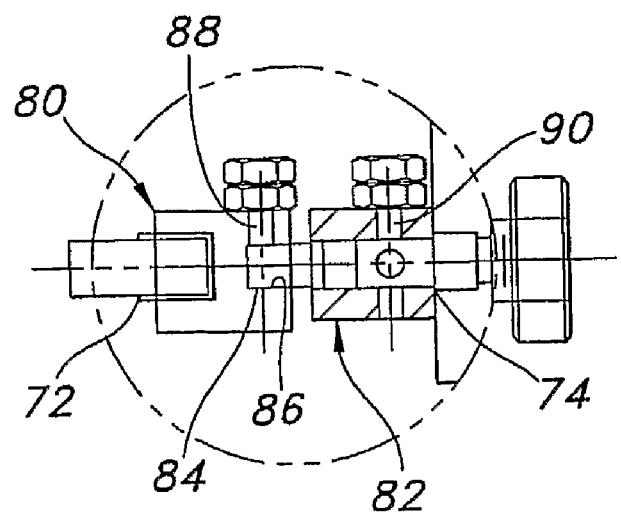
FIG. 4 is a schematic of a fault detector useable with the subject invention.

Optionally, a fault detector can be used with the system 10 to identify problems or conditions in the system 10. By way of non-limiting example, and with reference to FIG. 4, a representative fault detector arrangement is shown. As will be recognized by those skilled in the art, other arrangements are possible. As shown in FIG. 4, insulative members 80, 82 may be mounted, respectively, to the ends of the control stem 72 and the controllable stop 74. A conductive pin 84 extends from one of the insulative members 80, 82 which is shaped to extend into a bore 86 formed in the other of the insulative members 80, 82. As shown in FIG. 4, the conductive pin 84 preferably extends from the insulative member 82 mounted to the controllable stop 74. A conductive wire 88 is secured to the insulative member 82 to electrically engage the conductive pin 84 when inserted into the bore 86 a pre-determined distance, and a second conductive wire 90 electrically engages the conductive pin 84. The conductive wires 88, 90 are connected to an electrical measuring device (amp meter or volt meter) to determine if an electrical circuit is established. If the conductive pin 84 is not sufficiently inserted into the bore 86, an electrical circuit will not be established and detected by the electrical measuring device. Advantageously, an electrical measuring device 92 may be provided with the controller 76 (FIG. 2). With the lack of an electrical circuit, the controller 76 may display a warning or message indicating required action or condition of the system 10.

As will be recognized by those skilled in the art, the conductive pin 84 will partially or wholly disengage from the bore 86 where the control stem 72 does not travel in concert with the controllable stop 74. During normal operation, this may occur due to insufficient pressure acting on the braking piston 64, which in turn, may have been caused by: loss of, or insufficient pneumatic pressure at the dispensing piston 22; loss of or insufficient, hydraulic fluid 58; the dispensing container 12 being empty; and/or, inability of the fluid product F to be dispensed from the dispensing container 12 (e.g., clogged nozzle; partial or whole curing of the fluid product F within the dispensing container 12). Corresponding instruments can be used to monitor the system 10 and diagnose the specific problem (e.g., pressure gauges may monitor actual pressures and verify low pressure conditions).

Figure 5:
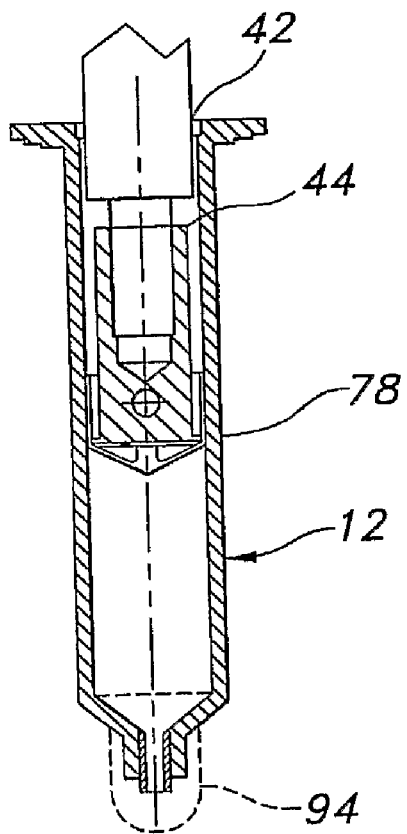
FIG. 5 is a partial cross-sectional view of the system illustrating a fluid product shut-off arrangement.

The fault detector can also be utilized to establish when the dispensing container 12 has been properly mounted and readied. With readying the system 10, the dispensing container 12 is mounted onto the dispensing cylinder 20, as described above. In addition, the plunger 44 may be driven forwardly to engage the container piston 78 by the dispensing piston 22. The plunger 44 is preferably moved with the nozzle or outlet of the dispensing container 12 being blocked or covered, such as with a cap 94 (FIG. 5). As the plunger 44 is driven forwardly, the plunger 44 will stop upon sufficient resistance from the container piston 78 (due to pressure build-up in the dispensing container 12). Simultaneous to the plunger 44 being driven forwardly, the controllable stop 74 is retracted. As a result, the braking piston 64 will be allowed to move under force of the hydraulic fluid 58. Where the plunger 44 is no longer driven forwardly, the braking piston 64 is also unable to travel further (i.e., no further hydraulic fluid 58 will be driven into the braking piston 64). As the controllable stop 74 continues to retract, and the control stem 72 is stationary, the conductive pin 84 is withdrawn from the bore 86 sufficiently until the circuit of the fault detector is broken. At that point, the controller 76 may indicate that the dispensing container 12 is ready and re-set the controllable stop 74 into engagement with the control stern 72 ready for use.

A mechanism may also be provided to accurately shut-off the amount of the fluid product F being dosed. With reference to FIG. 5, the container piston 78 is shown in engagement with the plunger 44. The container piston 78 and the plunger 44 are preferably engaged to move in concert. It is preferred that at the end of a dosing stroke, the container piston 78 be slightly withdrawn to cause suction in the dispensing container 12. This slight suction not only shuts-off a dose, but inhibits leakage between doses.

It is preferred that the container piston 78 be slightly withdrawn under force of the controllable stop 74 acting against the control stem 72. With pressure acting on the control stem 72, the braking piston 64 forces the hydraulic fluid 58 into the dispensing cylinder 20 to act against the dispensing piston 22. The dispensing piston 22 is thus forced to withdraw, resulting in rearward movement of the plunger 44. It is further preferred that the withdrawn position be maintained and, that upon a following actuation, the dispensing piston 22 travel a sufficient distance to cover the withdrawn distance plus a distance proportional to a desired dosage amount.

Figure 6:
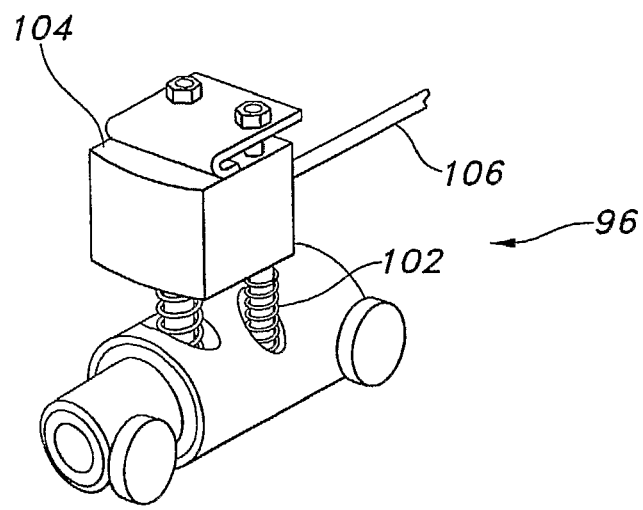
FIG. 6 is a perspective view of a pinch valve useable as a fluid product shut-off.
Figure 7:
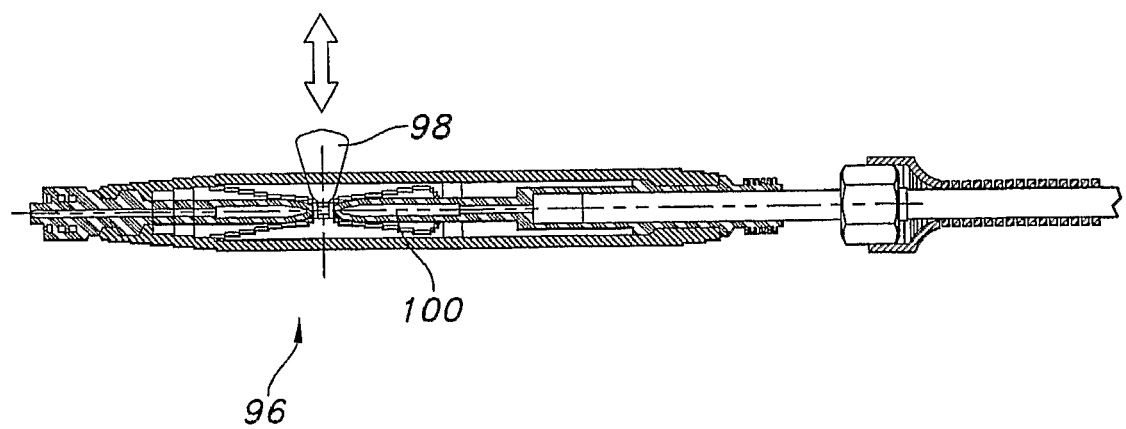
FIG. 7 is a cross-sectional view of a pinch valve useable as a fluid product shut-off.

As will be appreciated by those skilled in the art, various shut-off arrangements may be used with the subject invention. With reference to FIGS. 6 and 7, a pinch valve 96 may be used to shut-off flow from the dispensing container 12. As shown schematically in FIG. 7, the pinch valve 96 includes a pinch member 98 that forces down on fluid path 100 in a natural state to shut off flow through the fluid path 100. By displacing the pinch member 98 away from the fluid path 100, the fluid path 100 may be opened up to permit fluid flow therethrough. The pinch valve 96 is desirably mounted adjacent to the nozzle or outlet of the dispensing container 12. In this location, the pinch valve 96 may be in its natural, closed state (with the pinch member 98 closing off flow) between dosings to stop flow and minimize leakage.

As will be further appreciated by those skilled in the art, the pinch member 98 may be biased to its natural, closed state by biasing means 102 (e.g., a coil spring). Any known motive force may be used to displace the pinch member 98 against the biasing means 102. Displacement of the pinch member 98 will open the fluid path 100 and permit flow therethrough. A pneumatic actuator 104, as is known in the art, may be used to impart the motive force to displace the pinch member 98, and pneumatic line 106 may provide the required pressurized air. A hydraulic actuator, or manual force, may be used alternatively.

What is claimed is:

1. A system for dispensing a controlled amount of fluid product from a dispensing container comprising:
    a pneumatically driven dispensing actuator including a dispensing cylinder and a movable dispensing piston, said dispensing piston being movable responsively under pneumatic pressure within said cylinder, said cylinder including a volume of hydraulic fluid under said pneumatic pressure acting against said dispensing piston to selectively prevent movement of said dispensing piston; and
    braking device including a braking cylinder and a braking piston, said braking device being in hydraulic communication with said volume of said hydraulic fluid in said dispensing cylinder, said braking piston being selectively movable within said braking cylinder by a controllable stop to allow selective reduction of said volume of said hydraulic fluid in said dispensing cylinder and to allow controlled dispensing movement of said dispensing piston in response to said reduced volume;
    said controlled movement of said dispensing piston causing controlled displacement of said fluid product from said dispensing container.

2. A system of claim 1 wherein said controllable stop is controlled by a step motor.

3. A system of claim 1 wherein said controllable stop is controlled by a servomotor.

4. A system of claim 1 wherein said dispensing cylinder and said braking cylinder are in hydraulic communication via a hydraulic line.

5. A system of claim 1 wherein said dispensing piston is sealed within said dispensing cylinder with a pair of spaced apart o-rings and wherein said piston includes a relief outlet for bleeding off pneumatic pressure leakage between said o-rings.

6. A system for dispensing a controlled amount of fluid product from a dispensing container comprising:
    a pneumatically driven dispensing actuator including a dispensing cylinder and a movable dispensing piston, said dispensing piston being movable responsively under applied pneumatic pressure within said cylinder, said cylinder including a volume of hydraulic fluid under said pneumatic pressure acting against said dispensing piston to selectively prevent movement of said dispensing piston; and
    a braking device including a braking cylinder and a braking piston, said braking device being in hydraulic communication with said volume of said hydraulic fluid in said dispensing cylinder, said braking piston being selectively movable within said braking cylinder by a controllable stop to allow said selective reduction of said volume of said hydraulic fluid in said dispensing cylinder to allow controlled dispensing movement of said dispensing piston under said applied pneumatic pressure;
    said controlled movement of said dispensing piston causing controlled displacement of said fluid product from said dispensing container.

7. A system of claim 6 wherein said controllable stop is controlled by a step motor.

8. A system of claim 6 wherein said controllable stop is controlled by a servomotor.

9. A system of claim 6 wherein said dispensing cylinder and said braking cylinder are in hydraulic communication via a hydraulic line.

10. A system of claim 6 wherein said dispensing piston is sealed within said dispensing cylinder with a pair of spaced apart o-rings and wherein said piston includes a relief outlet for bleeding off pneumatic pressure leakage between said o-rings.

11. A system for dispensing a controlled amount of fluid product from a dispensing container comprising:
    a pneumatically driven dispensing actuator including a dispensing cylinder and a movable dispensing piston, said dispensing piston being movable under applied pneumatic pressure within said cylinder, said cylinder including a volume of hydraulic fluid under said pneumatic pressure acting against said dispensing piston to selectively prevent movement of said dispensing piston under said applied pneumatic pressure;
    a braking device including a braking cylinder and a braking piston, said braking device being in hydraulic communication with said volume of said hydraulic fluid in said dispensing cylinder, said braking piston being selectively movable within said braking cylinder by said controller to allow selective reduction of said volume of said hydraulic fluid in said dispensing cylinder; and
    a controller for controlling said braking device;
    said controlled movement of said dispensing piston causing controlled displacement of said fluid product from said dispensing container.

12. A system of claim 11 further comprising a fault detector to detect a predetermined level of disengagement between said braking piston and said controllable stop.

13. A system of claim 11 further comprising means for shutting off flow from said dispensing container.

14. A system of claim 13, wherein said means for shutting off flow from said dispensing container includes a pinch valve.

15. A system of claim 13, wherein movement of said dispensing piston is reversed after controlled displacement of said fluid product from said dispensing container.

* * * * *